United States Patent Office 3,136,759
Patented June 9, 1964

3,136,759
5α,6β-DICHLORO-16,17-EPOXY-ALLOPREGNANE-3β-OL-20-ONE AND ESTERS THEREOF
Percy L. Julian and John W. Cole, Oak Park, Ill., assignors, by mesne assignments, to Chas. Pfizer & Co., Inc., New York, N.Y., a corporation of Delaware
No Drawing. Filed May 17, 1954, Ser. No. 430,442
3 Claims. (Cl. 260—239.55)

This invention relates to a novel process of chlorinating Δ$^5$-steroids. More particularly, it relates to an improved process for preparing trans-5,6-dichlorosteroids, and especially it relates to the preparation of trans-5,6-dichloro-16,17-epoxy-pregnan-3β-ol-20-one acetate.

In investigations carried out on steriods, it has long been known that nuclear double bonds are susceptible to attack by various reagents. Accordingly, methods were devised to protect such reactive centers of the steriod nucleus against undesirable attack. Thus, the 5,6-double bond present in many steroids can be protected by bromination to form the 5,6-dibromide which, upon treatment with chromous chloride, zinc and acetic acid and the like, is readily debrominated, regenerating the original double bond. This well-known synthetic procedure is aptly illustrated by the synthesis of Reichstein's Substance "S." In the procedure devised by Julian et al., J.A.C.S. 72, 5145 (1950), the practicality of protecting the 5,6-double bond, fortunately present in 16-dehydropregnenolone, obtainable from the readily available soya sterols or Mexican sapogenins, has made this procedure commercially feasible. On the other hand, the method devised by Gallagher et al., J.A.C.S. 71, 3262 (1949), employs as the starting material relatively rare pregnan-3α-ol-20-one, thus involving the unwelcome task of introducing the double bond into ring A of the steroid nucleus.

However, as is well known, bromination of ethylenic double bonds leads to a mixture of geometric isomeric dibromides, which differ in the ease of and behavior upon debromination. Further, as pointed out originally by Mauthner, Monatsch. 15, 91 (1894), and studied most recently by Barton, J.A.C.S. 72, 1066 (1950), 5,6-steroid dibromides, such as cholestene dibromide, undergo mutarotation in solution even at room temperature. Inasmuch as for usual synthetic work it is desirable to obtain (1) pure compounds, or more specifically compounds which are sufficiently stable for purification and identification, and (2) compounds which can be efficiently handled in a proposed synthetic scheme, it will be seen that the dibromides are objectionable since (1) upon conventional bromination Δ$^5$-steroids form mixtures of 5,6-dibromides, (2) in solution at ordinary temperatures the less stable isomer undergoes a spatial shift to a more stable form, and (3) the isomeric dibromides differ in their behavior towards debrominating agents. However, as has been shown by Barton, J.A.C.S. 72, 370 (1950), the addition of chlorine in the presence of antimony trichloride to the 5,6-double bond of cholesteryl benzoate yields essentially one dichlorocholestan-3β-ol-benzoate, which does not undergo mutarotation. This, according to Barton, is a "trans" form, i.e., 5α,6β-dichloro-, which, in accordance with the prevailing theory of elimination of nuclear substituents, should be dechlorinated, and thus to regenerate the 5,6-double bond, more readily than a "cis" form. In accordance with the above theoretical considerations, we have found that the products of direct chlorination of Δ$^5$-steroids are stable and readily dechlorinated. Further, such dichlorides are easily purified and give rise to nicely crystalline products upon further synthetic processing.

It is accordingly an object of the present invention to provide a novel process for chlorinating Δ$^5$-steroids.

A further object is to provide an improved process for producing Δ$^{5,6}$-trans-dichloro-steroids.

Another object is to provide a novel process for producing 5α,6β-dichloro-steroids.

Other objects will be apparent to those skilled in the art from the following description.

In the course of our investigations, we have made the further surprising discovery that chlorination of Δ$^5$-steroids, in the presence of a basic substance rather than acidic salts, such as antimony trichloride, which was used by Barton, enabled us to prepare the trans-dichlorides in excellent yield.

The process of our invention is broadly applicable to any Δ$^5$-steroid. In general, we have found it practical to dissolve the Δ$^5$-steroid in a nonreactive solvent and to the solution add a basic material such as pyridine. The mixture is cooled to about 0° C. and to it is added a slight excess of chlorine. The chlorine is added slowly until a pale yellow color persists, indicating that the compound will not react with a further amount of chlorine. On small scale runs it is preferred to add the chlorine in the form of a cold solution thereof in a suitable nonreactive solvent, e.g., carbon tetrachloride. In larger batches it is preferable, as a matter of convenience, to add the chlorine directly into the cooled agitated solution of the Δ$^5$-steroid. Thereafter the reaction mass is washed to remove unreacted chlorine, the basic material, etc. and the solvent is removed, e.g., by distillation with steam. The product is isolated by filtration and purified by recrystallization from a suitable solvent.

The amount of basic material present is preferably at least sufficient to bind all of the hydrogen chloride produced by anomalous reaction, i.e., random chlorination. In general, we have found that an amount of basic material equivalent to about 0.1 part by weight of the Δ$^5$-steroid to be sufficient when pyridine is the base used. It will be within the skill of the trained chemist to follow the reaction and should the mass become acid or fumes of hydrogen chloride emanate from the mixture, to add more of the basic substance. It is not intended to imply that the basic material functions only to bind hydrogen chloride and thus to improve the process. It is believed that the basic material functions also to alter the stereospecific course of the reaction, since the product is essentially free of cis-dichlorides. Depending upon the steroidal material being chlorinated, we obtain from about 85% to 95% of the trans-dichloride and from 5% to 15% of chlorinated by-products.

The following examples will illustrate the process of our invention:

EXAMPLE 1

A solution of 20 g. of 16,17-epoxy-5-pregnen-3β-ol-20-one acetate in 100 cc. of methylene chloride to which 2 cc. of pyridine has been added was cooled to and maintained at about 0° C. in an ice-salt mixture. To the agitated mass 4.45 g. of chlorine dissolved in 91 cc. of carbon tetrachloride was added dropwise during a period of 8 minutes. The faintly yellow mass was agitated for two minutes thereafter. After being washed with 2% aqueous hydrochloric acid and with water, the reaction mixture was distilled with steam for ten minutes. The white crystalline slurry was washed and about one-fourth of the liquor was decanted. Methanol, in amount equivalent to about half of the remaining volume, was added and the slurry was filtered. The filter-cake was washed with 50% aqueous methanol and dried. The crude product amounted to 23.3 g., 97% of the theoretical amount obtainable, and melted at 206° to 212° C.; optical rotation $(\alpha)_D^{25°} = -18°$ (CHCl$_3$). Upon recrystallization from acetone, the product, 16,17-epoxy-5α,6β-dichloro-allopregnan-3β-ol-20-one acetate, melted at 218° to 221° C. The cis-isomer, prepared according to the method of Berg and Wallace, J. Biol. Chem. 162, 683 (1950), melted at 245° to 248° C.; $(\alpha)_D = +20°$ (CHCl$_3$).

The trans-dichloride acetate was hydrolyzed to the free 3β-hydroxy compound by boiling with alcoholic potassium hydroxide in the conventional manner. Thusly, 16,17-epoxy-5α,6β-dichloro-allopregnan-3β-ol-20-one, M.P. 192° to 194° C., was obtained.

The product can be dehalogenated and the epoxy-pregnenolone acetate starting material recovered in better than 90% yield by catalytic hydrogenation in the presence of palladium on calcium carbonate.

EXAMPLE 2

A solution of 7.48 g. of 5-pregnene-3β,17α-diol-20-one 3-acetate dissolved in 100 cc. of chloroform was cooled in an icebath. After the addition of 0.75 cc. of pyridine, 1.704 g. of chlorine in 30 cc. of carbon tetrachloride were added dropwise in 10 minutes. The faintly yellow solution was washed with water, aqueous sodium bicarbonate and finally with water. The washed solution was concentrated under vacuum to a semi-solid mass, taken up in methylene chloride and boiled for a short time. Then, after the addition of methanol, the major portion of the methylene chloride was taken off under vacuum. The mass was crystallized by cooling and then filtered. In this manner 6.0 g., 67.5% of theory, of 5α,6β-dichloro-allopregnane-3β,17α-diol-20-one 3-acetate, M.P. 222° to 225° C., was obtained.

Analysis. — Calculated — Cl=15.95%. Found— Cl=16.70%.

Repeated recrystallization of a similarly prepared material from methylene chloride-methanol gave a product having 16.1% chlorine, M.P. 222° to 228° C.; $(\alpha)_D = -66.4°$ (CHCl$_3$). Hydrolysis of the product with methanolic potassium hydroxide yielded the free 3β-hydroxy derivative, M.P. 199° to 201° C.

Repetition of the above experiment, but without the addition of pyridine, results in a yield of 57% of the theoretical amount obtainable of a product melting at 216° to 223° C. A strong odor of hydrogen chloride was noted at the conclusion of the addition of the chlorination, indicating some substitution reaction. This fact, plus the lower yield and purity of the crude reaction product, is an indication of the value of the presence of basic substances.

EXAMPLE 3

A solution of 7.12 grams of 5,16-pregnadien-3β-ol-20-one acetate in 105 cc. of methylene chloride, containing 2 cc. of pyridine, was cooled to 1° C., and to it was added a solution of 1.68 g. of chlorine dissolved in 35 cc. of carbon tetrachloride. The chlorine solution was added dropwise over a period of 3 to 4 minutes. The resulting mixture was agitated for about five minutes thereafter. It was washed with aqueous hydrochloric acid and then with water. The washed solution was dried over anhydrous sodium sulfate and then concentrated to a low volume. The residue was diluted with 50 cc. of methanol and evaporated to incipient crystallization. After being cooled, the crystals were filtered to recover 0.9 gram of unchanged starting material.

The mother liquor on dilution with 50–50 methanol-ether gave 3.9 g. of reaction product, 5α,6β-dichloro-16-allopregnene-3-ol-20-one acetate, which, after recrystallization from dilute acetone, melted at 137° to 141° C. UV: $E_{max}$ at 239 mμ=9800.

EXAMPLE 4

To a cold, −20° C., solution of 12.5 g. of cholesteryl benzoate dissolved in 150 cc. of chloroform and containing 2.5 cc. of pyridine, 2.0 g. of chlorine dissolved in 45 cc. of chloroform was added dropwise during three minutes. The pale yellow solution was extracted with dilute aqueous hydrochloric acid, aqueous sodium bicarbonate and lastly with water. The solvent solution was dried over anhydrous sodium sulfate and then evaporated to dryness under vacuum.

The pale yellow residue was recrystallized from ethyl acetate-methanol and gave 10.36 g. first crop, M.P. 127–131° C., plus 2.1 g. second crop, M.P. 121–127° C.; 126–130° C. after recrystallization, of 5α,6β-dichlorocholesteryl benzoate. The combined first and second crops represent a yield of 87% of the theoretical amount obtainable.

Analysis for $C_{34}H_{50}O_2Cl_2$.—Percent Cl calculated= 12.66%. Percent Cl found=12.67%.

Rotation $(\alpha)_D = -22.6°$ (chloroform).

EXAMPLE 5

Preparation of "5,6-Dichloro (Trans)-Diosgenin" Acetate 45.6 g. of diosgenin acetate was dissolved in 500 cc. CHCl$_3$ and cooled to −20° C. in acetone-Dry Ice bath. Ten cc. pyridine was added and then a solution of 8 g. of chlorine in 180 cc. of chloroform was added dropwise. The diosgenin solution was dark green colored and no color change was noted. The solution was stirred for about fifteen minutes after chlorine addition. The solution was washed with water, bisulfite, dilute HCl, aqueous bicarbonate and water, then filtered through Na$_2$SO$_4$ and evaporated to dryness in vacuo. The residue was a dark orange tarry oil, which crystallized on standing.

The crude crystallizate was taken up in ethyl acetate, treated with activated carbon and filtered. The filtrate was concentrated and then diluted with MeOH, and set aside to crystallize. The resulting slurry was filtered and washed with 50–50 MeOH·EtOAc: first crop=30.0 g. M.P. 217°–222° C.

The mother liquor was concentrated to a low volume, diluted with MeOH, seeded and put in cold room overnight to obtain a second crop; second crop=6.5 g.

First crop material recrystallized from acetone gave buff-colored crystals, M.P. 224–226° C.

Percent chlorine: $C_{29}H_{44}O_4Cl_2$; calc. 13.47%; found 13.46, 13.36.

No further attempt was made to isolate material from second crop mother liquor, which was quite tarry. Total yield obtained was 80% by weight, or 69% of theory.

The acetoxy-diosgenin-dichloride thus obtained can be treated in the same manner as diosgenin for the production of the analogous Δ$^{16}$-pregnene derivative, 5α,6β-dichloro-16-allopregnene-3β-ol-20-one acetate, which, in turn, upon treatment with alkaline hydrogen peroxide, yields the epoxy acetate of Example 1.

The free 3-hydroxy compound can also be employed and the esters produced at any stage can be hydrolyzed to produce the analogous free 3-hydroxy compound.

It can readily be seen from the above illustrative examples that a method of preparing 5,6-trans-dichloro-steroids of good quality and in high yields has been provided. It is to be understood, moreover, that our invention is not to be limited to the treatment of the particular compounds enumerated, but is broadly applicable to the stereospecific dichlorination of Δ$^5$ steroids.

Other bases, preferably tertiary amines, can be used, although pyridine and its alkyl derivatives, e.g., picolines, lutidenes, etc., are preferred. Such other tertiary amines as dimethyl aniline, triethyl amine and the like can be used in the process of our invention.

It is preferred to conduct the process of our invention at temperatures between −30° and 10° C., and especially at 0° C. Because of the greater tendency to random chlorination at increased temperatures and the reduced reaction rate at decreased temperatures than that of our preferred range, the optimum reaction temperature will be a function of the reactivity of the particular Δ$^5$-steroid being chlorinated. The selection of the optimum temperature for a particular compound will be within the range of −30° and 10° C. and also within the skill of the trained steroid chemist.

Any non-reactive organic solvent can be used for the reaction medium. Preferably, the chlorinated solvents such as chloroform and carbon tetrachloride are used. However, others such as diethyl ether, pyridine and the like can be used.

In the above examples the 3-hydroxy substituent has been protected in the form of the 3-acetate. Due to the oxidizing tendency of chlorine, it is preferable that any hydroxy substituents be so protected. Other acyl radicals than the acetyl can be used. Because of the ease of obtaining them, the lower alkyl acyl esters are preferred, although others such as the benzoyl, naphthoyl, hemisuccinyl, picolanyl and like acyl radicals can be used instead of the illustrated acetyl radical.

Our invention has been described in the foregoing specification, of which the illustrative examples are a part. Where recourse has been made to certain theoretical explanations, it is to be distinctly understood that the ultimate correctness of said theories is in no way to be held as a limitation upon our invention.

Having described the invention, what is claimed is:

1. A compound selected from the class consisting of $5\alpha,6\beta$-dichloro - 16,17 - epoxy-allopregnane-$3\beta$-ol-20-one; and the 3 esters thereof with a lower hydrocarbon carboxylic acid.

2. $5\alpha,6\beta$-dichloro-16,17-epoxy - allopregnane-$3\beta$-ol-20-one.

3. $5\alpha,6\beta$-dichloro - 16,17 - epoxy-allopregnane-$3\beta$-ol-20-one acetate.

References Cited in the file of this patent

UNITED STATES PATENTS

| | | |
|---|---|---|
| 2,232,438 | Butenandt | Feb. 18, 1941 |
| 2,313,732 | Butenandt | Mar. 16, 1943 |
| 2,340,388 | Inhoffen | Feb. 1, 1944 |
| 2,686,181 | Julian | Aug. 10, 1954 |
| 2,884,417 | Cutler et al. | Apr. 28, 1959 |

OTHER REFERENCES

Barton: J. American Chem. Soc., pp. 370–374, vol. 72, January 1950.

Julian: J. American Chem. Soc., pp. 5145–5147, November 1950.